(12) United States Patent  (10) Patent No.: US 7,571,188 B1
Schwetman, Jr. et al.  (45) Date of Patent: Aug. 4, 2009

(54) CACHE ABSTRACTION FOR MODELING DATABASE PERFORMANCE

(75) Inventors: Herbert Dewitt Schwetman, Jr., Austin, TX (US); Philip Eugene Cannata, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 620 days.

(21) Appl. No.: 10/948,389

(22) Filed: Sep. 23, 2004

(51) Int. Cl.
*G06F 7/00* (2006.01)
*G06F 17/00* (2006.01)

(52) U.S. Cl. ............... 707/104.1; 707/200; 711/122
(58) Field of Classification Search ............. 707/3, 707/8, 10, 102, 200, 201
See application file for complete search history.

(56) References Cited

U.S. PATENT DOCUMENTS

| | | | | |
|---|---|---|---|---|
| 5,946,711 A * | 8/1999 | Donnelly | | 711/152 |
| 6,145,058 A * | 11/2000 | Suganuma | | 711/134 |
| 6,298,416 B1 * | 10/2001 | Arimilli et al. | | 711/122 |
| 6,301,641 B1 * | 10/2001 | Verhoeven et al. | | 711/118 |
| 6,385,697 B1 * | 5/2002 | Miyazaki | | 711/128 |
| 6,556,952 B1 * | 4/2003 | Magro | | 702/183 |
| 6,725,308 B2 * | 4/2004 | Joy et al. | | 710/200 |
| 6,813,691 B2 * | 11/2004 | Gaither et al. | | 711/133 |
| 6,952,664 B1 * | 10/2005 | Lahiri et al. | | 703/14 |
| 7,124,249 B1 * | 10/2006 | Darcy | | 711/122 |
| 2001/0010069 A1 * | 7/2001 | Hetherington et al. | | 711/122 |
| 2002/0019969 A1 * | 2/2002 | Hellestrand et al. | | 716/5 |
| 2002/0049824 A1 * | 4/2002 | Wilson | | 709/213 |
| 2002/0095559 A1 * | 7/2002 | Mekhiel | | 711/168 |
| 2002/0199112 A1 * | 12/2002 | Gammel et al. | | 713/194 |
| 2003/0014603 A1 * | 1/2003 | Sasaki et al. | | 711/158 |
| 2003/0088739 A1 * | 5/2003 | Wilkes et al. | | 711/133 |
| 2003/0172234 A1 * | 9/2003 | Soltis, Jr. | | 711/122 |
| 2004/0015731 A1 * | 1/2004 | Chu et al. | | 713/300 |
| 2004/0103251 A1 * | 5/2004 | Alsup | | 711/122 |
| 2004/0111514 A1 * | 6/2004 | Chase et al. | | 709/226 |
| 2004/0236726 A1 * | 11/2004 | Ewing et al. | | 707/3 |
| 2005/0193160 A1 * | 9/2005 | Bhatt et al. | | 711/3 |

* cited by examiner

*Primary Examiner*—John R. Cottingham
*Assistant Examiner*—Michael Pham
(74) *Attorney, Agent, or Firm*—Osha • Liang LLP

(57) ABSTRACT

A method for modeling a database management system involving receiving a query, computing a hit rate value associated with a cache, wherein the hit rate value is computed using a counter group, comparing the hit rate value to a predetermined value to obtain a result, providing a reply to the query if the result is a hit, incrementing a counter in the counter group when the cache is not full and proceeding to a next cache if the result is a miss, and providing a diagnostic output for the database management system.

9 Claims, 5 Drawing Sheets

CACHE ABSTRACTION FOR MODELING DATABASE PERFORMANCE

BACKGROUND

A database management system, such as a directory server, provides a network service for the management of information about an entity, typically including data on computers, other network services, users, customers, and subscribers. A database management system typically includes characteristics such as a hierarchical object-oriented naming model, extensive search capabilities, an extensible schema, built-in attribute-level security, shared network access, and an underlying storage mechanism, allowing the database management system to be well-suited for the management of information.

Conventionally, a database management system provides information to a wide variety of applications. These applications, through the database management system, are able to share a common data repository. Some database management systems may provide information in the form of a single, centralized repository and some may employ multiple, small repositories for each type of application or a group of applications. Moreover, a database management system also provides various protocols that applications may use to access directories. For example, typical protocols provided by a particular type of database management system, known as a directory server, include Lightweight Directory Access Protocol (LDAP), Directory Services Markup Language (DSML), etc.

Conventionally, database management systems are modeled (i.e., simulated) to analyze the performance and scalability of the service. Typically, these features are implemented by modeling the components of a database management system that have the greatest impact on performance and scalability. For example, a common component of a database management system that is modeled is the cache (or cache hierarchy). In this case, each object of the cache is modeled to analyze the performance of the cache. For example, if a particular cache stores data in the form of pages, then each page would be modeled in a simulation of that particular cache.

In some instances, modeling each object represented by a database management system, or cache within a database management system, may result in a large amount of objects being simulated. Therefore, the tracking of various objects that are modeled becomes an increasingly difficult task. Moreover, as a result of simulating each object, the simulation results obtained may be difficult to analyze or improve upon.

SUMMARY

In general, in one aspect, the invention relates to a method for modeling a database management system comprising receiving a query, computing a hit rate value associated with a cache, wherein the hit rate value is computed using a counter group, comparing the hit rate value to a predetermined value to obtain a result, providing a reply to the query if the result is a hit, incrementing a counter in the counter group when the cache is not full and proceeding to a next cache if the result is a miss, and providing a diagnostic output for the database management system.

In general, in one aspect, the invention relates to a modeling system comprising an entry cache configured to store data, a database cache partitioned to store data, wherein each partition includes data and an index, a filesystem cache configured to store data, and a plurality of counter groups, wherein one of the plurality of counter groups is associated with the entry cache, one of the plurality of counter groups is associated with the database cache, and one of the plurality of counter groups is associated with the filesystem cache.

In general, in one aspect, the invention relates to a computer system for modeling a database management system comprising a processor, a memory, a storage device, and software instructions stored in the memory for enabling the computer system under control of the processor, to receive a query, compute a hit rate value associated with a cache, wherein the hit rate value is computed using a counter group, compare the hit rate value to a predetermined value to obtain a result, provide a reply to the query if the result is a hit, increment a counter in the counter group when the cache is not full and proceed to a next cache if the result is a miss, and provide a diagnostic output for the database management system.

Other aspects of the invention will be apparent from the following description and the appended claims.

DETAILED DESCRIPTION

Figure 1:
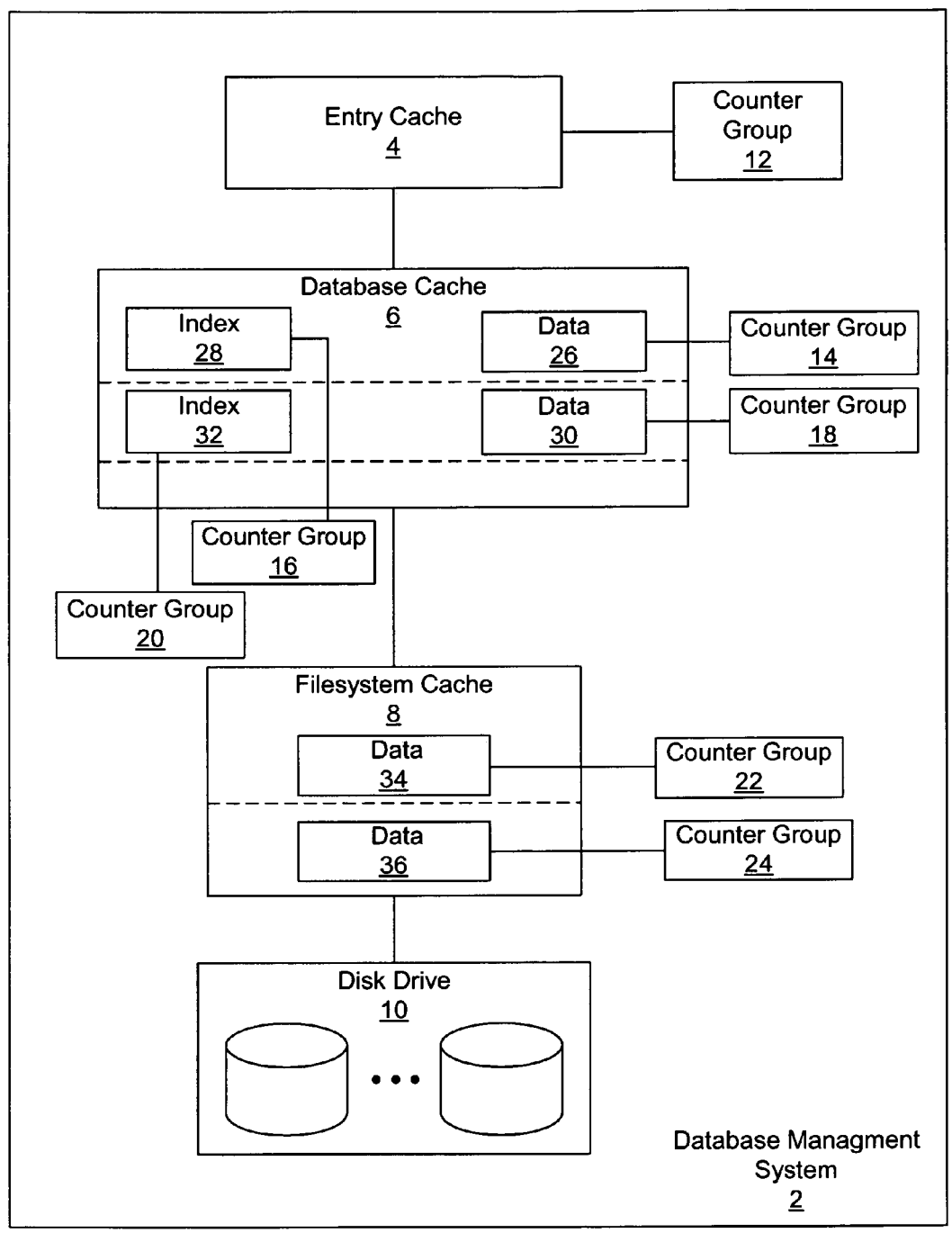
FIG. 1 shows a modeling system in accordance with an embodiment of the invention.

Exemplary embodiments of the invention will be described with reference to the accompanying drawings. Like items in the drawings are shown with the same reference numbers. Further, the use of "ST" in the drawings is equivalent to the use of "Step" in the detailed description below.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to modeling a database management system in order to analyze the performance of the database management system. More specifically, embodiments of the invention relate to modeling cache behavior by using a counter group to represent each cache in a cache hierarchy. Further, counter groups are used to model the flow of data corresponding to searches and modifies within each cache in the cache hierarchy.

FIG. 1 shows a modeling system in accordance with an embodiment of the invention. In one embodiment of the invention, the modeling system models (or simulates) the performance of a database management system (2) (e.g., a directory server) by modeling the performance of a cache hierarchy within the database management system (2). Specifically, FIG. 1 shows an entry cache (4), a database cache (6), a filesystem cache (8), and a disk drive (10) organized in a hierarchy. Further, in one embodiment of the invention, each cache (or cache partition) is modeled using a counter group (12, 14, 16, 18, 20, 22, 24). For example, the entry cache (4) is modeled using a counter group that tracks specific values, such as the size of a file being cached, the capacity of the entry cache (4), and the current contents of the entry cache (4).

One skilled in the art will appreciate that the database cache and filesystem cache may be modeled using the same counter values described above (i.e., size of file being cached, capacity of cache, current contents of cache). Additionally, one skilled in the art will appreciate that the disk drive may not need to be represented with a counter group because the disk drive is large enough to contain all the data (i.e., data will always be found in the disk drive).

In one embodiment of the invention, a file refers to a large quantity of data to be stored in the cache hierarchy. A file may be several pages (or several entries) in size, and may not fit into any one particular cache. One skilled in the art will appreciate that only one file may exist that represents all the data in the database management system. Alternatively, the present invention may also be represented using several files of data arranged within a database management system.

Performance of the database management system enhances when the entire file of data can be placed in the entry cache because the entry cache is the first cache in the cache hierarchy to be searched for data. Other forms of cache, such as the database cache and the filesystem cache are searched subsequent to the entry cache. As a result, performance degrades as other caches in the hierarchy are used to store and retrieve data in the file. A disk drive is the farthest from the processor; therefore, if data must be retrieved from the disk drive, then performance is significantly low because accessing the disk drive takes a long time. Those skilled in the art will appreciate that the disk drive may be modeled as a cache, in which the disk drive is the last cache searched in the cache hierarchy.

In one embodiment of the invention, the entry cache stores files in the form of entries. For example, each entry of a file may be thought of as taking up one row of the entry cache. For the database cache and the filesystem cache, which both store files in the form of pages, each page of a file may be thought of as one row in the database cache and the filesystem cache. One skilled in the art will appreciate that a cache may store data using units other than entries or pages.

Continuing with FIG. 1, in one embodiment of the invention, the database cache (6) is partitioned into one or more partitions. Each partition of the database cache (6) stores data (26, 30) and an index (28, 32). The index (28, 32) is another type of file that stores a list of unique identifiers (IDs) that may be used to identify a particular search or modify query (i.e., a request from a user to search for or modify specific data within a file). Further, the data (26, 30) and indices (28, 32) of each partition within the database cache (6) are represented by counter groups (14, 16, 18, 20). Specifically, the data (26) and index (28) of a partition in the database cache (6) are represented in the model using the same counter values described above (i.e., a counter to track the size of the file being cached, a counter to track the capacity of the partition, and a counter to track the current contents of the partition). Therefore, each partition of the database cache includes counter groups for both the index and data within the partition. In other words, the counter groups are specific to the data in each partition rather than the database cache as a whole.

One skilled in the art will appreciate that the model may also be implemented using a counter group to track the aforementioned values for the database cache as a whole. Additionally, one skilled in the art will appreciate that if a database management system stores data in multiple files, then each partition of the database cache corresponds to one file and allows the cache to model storing multiple files of data.

In one embodiment of the invention, the database cache represents data and indices using well known indexing mechanisms. For example, the indexing mechanism may be a b-tree, hash tables, trie nodes, bit maps, etc. More specifically, the indexing mechanism allows the database cache to represent data and indices as interior nodes and leaf nodes (i.e., nodes of a tree index). The leaf nodes (i.e., data blocks) include the actual data stored by users of the database management system. Indirect nodes (i.e., indirect blocks) may be pointers that reference leaf nodes and store metadata that characterizes and provides information regarding the actual data. For example, referring to FIG. 1, the data (26) and index (28) of the first partition of the database cache (6) may be organized in a b-tree. Therefore, the counter groups that represent the data and indices of each partition in the database cache are used to model the index mechanism. For example, counter groups modeling the index may be used to predict the number of hits/misses on each probe (i.e., traversing of levels) of a b-tree indexing mechanism. In one embodiment of the invention, the levels are modeled using an algorithm that considers the size of a file and the size of entries. The levels of an indexing mechanism correspond to the number of probes required to traverse the metadata (e.g., the indirect nodes of the b-tree).

In one embodiment of the invention, the filesystem cache may also be partitioned. The filesystem cache may include several partitions that include only data (i.e., data (34), data (36) in FIG. 1). Additionally, data in each partition of the filesystem cache may also be organized using some indexing mechanism, such as b-tree, hash tables, trie nodes, bit maps, etc. One skilled in the art will appreciate that the counters modeling the indexing mechanism and the actual data of the filesystem cache may be used in the same manner described above to predict the hits/misses associated with each level (i.e., probe) of the filesystem cache.

Figure 2:
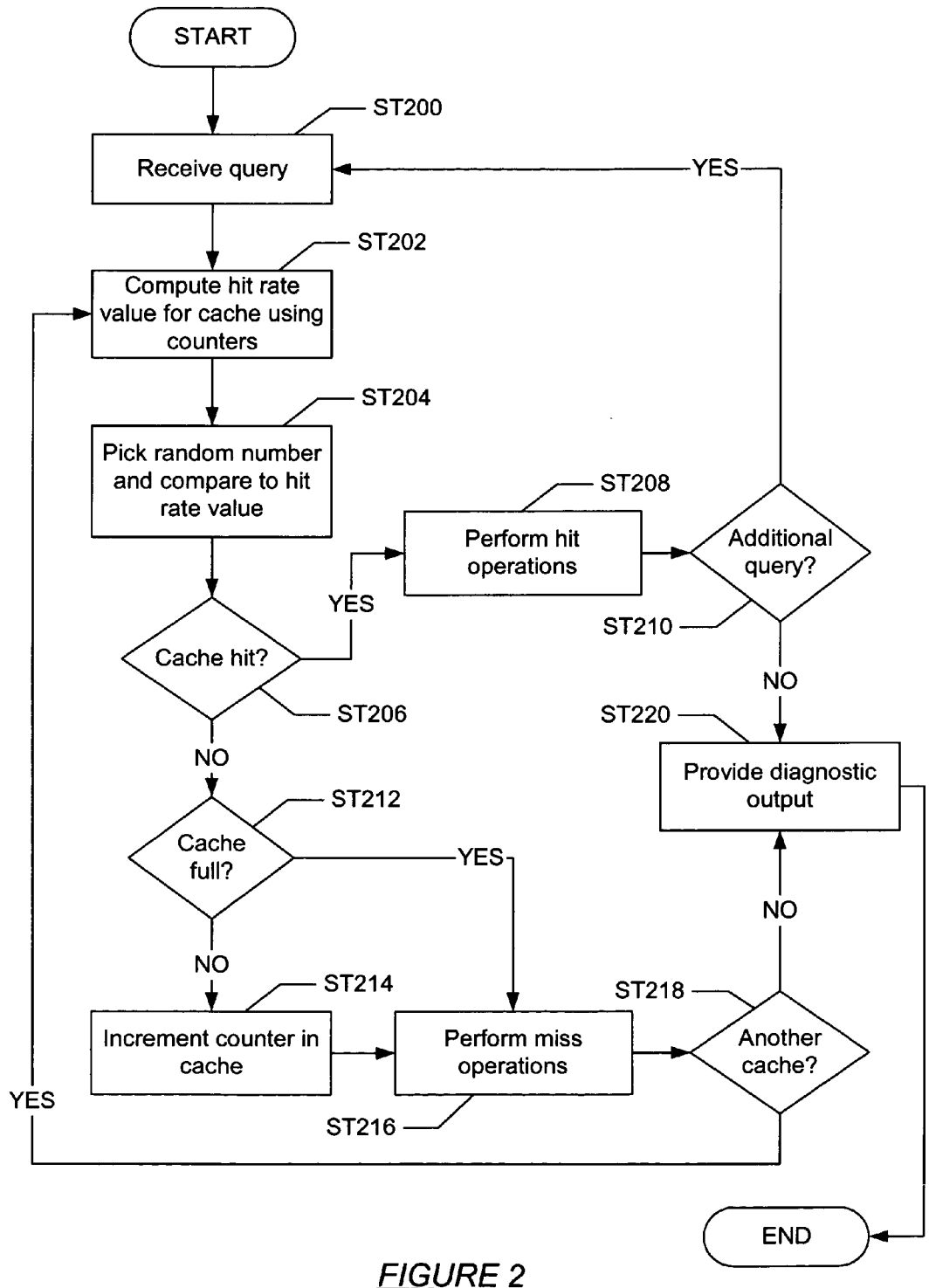
FIG. 2 shows a flow chart for modeling a cache hierarchy in accordance with an embodiment of the invention.

FIG. 2 shows a flow chart for modeling a cache hierarchy in accordance with one embodiment of the invention. Initially, the process begins by preloading the counter groups for each cache and initializing the counters to the maximum value (not shown). In one embodiment of the invention, preloading the counter groups allows the model to represent steady-state behavior (i.e., when the model becomes stable) without actually loading the cache with data. This requires preloading the cache hierarchy correctly (i.e., determining what percentage of each cache is devoted to each file stored in the cache hierarchy). Alternatively, in one embodiment of the invention, transient cache behavior may be modeled by starting with an empty cache hierarchy (i.e., no data is stored in the cache hierarchy) and slowly allowing the model to fill in entries and pages of the cache hierarchy with each cache miss that is encountered. In this manner, the time required when a transient method is used to store entries/pages in the cache hierarchy may be observed.

Continuing with FIG. 2, once the counter groups have been preloaded and initialized (or transient cache behavior has been modeled), a query is received (Step 200). The query may be a search query (i.e., search for a particular entry or page in a cache) or modify query (i.e., modify/write particular entry or page in a cache). Subsequently, a hit rate value is computed for the entry cache (i.e., the first cache that is searched for the entry/page) (Step 202). The hit rate value signifies the probability of a hit in a particular cache and is computed using the counter group of the cache. Specifically, the hit rate value is calculated by computing the ratio of the cache capacity over the file size (i.e., the size of the cached file). For example, if the entry cache has a capacity of 100 entries, and the size of the file which contains the entry/page associated with the query request is 250 entries/pages, then the hit rate is 0.4. In other words, the probability of finding the entry/page associated with the query in the entry cache is 0.4. One skilled in the art will appreciate that if the entire file fits into the entry cache, then the hit rate is always 1.0 (i.e., 100% of the probes). This is because any entry/page of the file is always found in the entry cache.

Once the hit rate value is calculated, a random number between (i.e., between zero and one) is picked from a uniform distribution (Step 204). The random number is subsequently used to determine whether the entry/page corresponding to the query is a hit or a miss in the cache (Step 206). If the random number is less than the calculated hit rate value, then the model proceeds to perform hit operations (Step 208). Hit operations may include replying to the original query received. For example, if the query was a search query, then the search criteria found by encountering a hit may be returned in the form of a reply. If the query was a modify query, then the data may be modified in the cache. If there are more queries to process (Step 210), then Steps 200-206 are repeated for each additional query. One skilled in the art will appreciate that the model of the present invention simulates a uniform and random access to data across the cache hierarchy. In other words, no particular area within a cache or within the cache hierarchy is more likely to have data than any other area or cache. Therefore, choosing a random number from a uniform distribution accurately reflects whether a hit or miss occurs in a particular cache.

Returning to Step 206, if the random number is greater than the calculated hit rate value, a cache miss occurs. When a cache miss occurs, the entry/page that corresponds to the query received is brought into the entry cache (i.e., upon finding the entry in another cache within the cache hierarchy). Therefore, when a cache miss occurs, a determination is made to check whether the entry cache is full (Step 212). If the cache is not full, then the current contents counter value is incremented to account for the entry/page that is brought into the entry cache (Step 214). Alternatively, if the cache is full, then the counter values are already at a maximum value and do not need to be incremented further. Subsequently, miss operations are performed (Step 216). If another cache is in the hierarchy (Step 218), then an attempt is made to satisfy the query in the next cache of the hierarchy (i.e., Steps 202-218 are repeated for each cache until data corresponding to query is found). For example, when a cache miss occurs in an entry cache, the database cache is searched for the query. Similarly, when a miss occurs in the database cache, the filesystem cache is searched for the query.

One skilled in the art will appreciate that data is always found in the disk drive. In one embodiment of the invention, once the data is found in any cache below the entry cache, the data is replicated into all the caches above the cache in which the data was found. For example, if data corresponding to a query is found in the filesystem cache, the data is subsequently brought into both the database cache and the entry cache, and the counter groups in each of the database cache and entry cache are incremented to reflect that the current contents of both caches has increased.

Once the data is found in any one of the caches, the entire process may repeat for each additional query received for as long as the model/simulation is run. At a defined stage of the simulation, a diagnostic output is provided to the user (Step 220). In one embodiment of the invention, the diagnostic output reflects the number of searches per second and the number of modifies per second that the cache hierarchy performs. This diagnostic output allows a user to determine the overall performance of the database management system.

Figure 3:
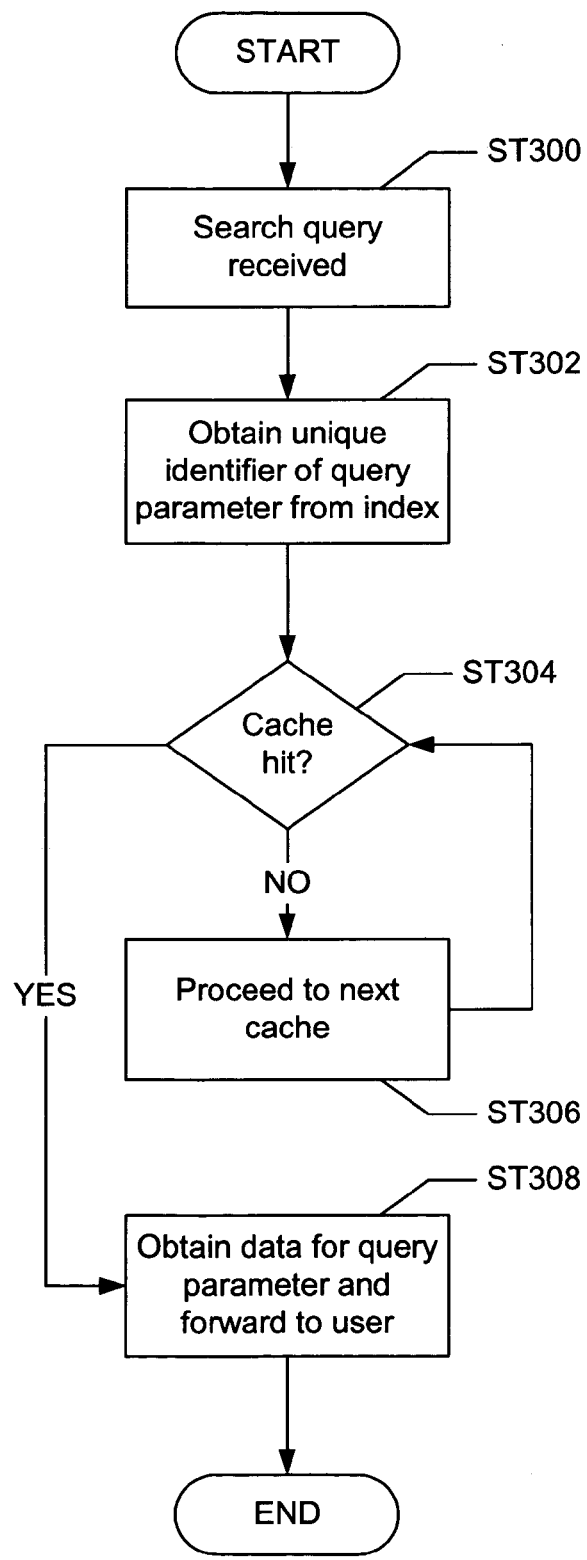
FIG. 3 shows a flow chart for modeling searches in accordance with an embodiment of the invention.

FIG. 3 shows an example of modeling searches in accordance with one embodiment of the invention. Initially, a search query is received by the database management system (Step 300). The search query may be from any user or client of the database management system. Subsequently, the indices residing in the database cache are used to find a unique ID corresponding to the search query (Step 302). For example, if a particular query is searching for a name in the cache hierarchy, the indices are searched to find the unique ID of that particular entry (i.e., that name) of a file. At this stage, the counter values are used to predict and model the amount of time necessary to find the unique ID corresponding to the search query. For example, in one embodiment of the invention, if each index is organized in a b-tree, then the counter group is used to predict the amount of time to traverse the b-tree indices to find the unique ID corresponding to the search query.

Upon obtaining the unique ID corresponding to the search query, the entry cache is probed to attempt to satisfy the query. At this stage, a determination is made whether the search query is a hit or miss in the entry cache (Step 304). If the entry is found in the entry cache, then the data corresponding to the search query is obtained from the cache and forwarded to the user (Step 308). Alternatively, if the entry is not found in the entry cache, then the query proceeds to the next cache (i.e., the database cache) (Step 306). This process continues (i.e., Steps 304-306 repeat) until the data is found in a cache and the search query is satisfied. One skilled in the art will appreciate that for each search query, whenever there is a cache miss, (and the cache is not full) the counter group for that cache is incremented and data is brought into the cache. One skilled in the art will also appreciate that the hit/miss with reference to a search query is modeled in the same manner as described in FIG. 2 (i.e., a hit rate value is calculated, a random number is chosen, etc).

Figure 4:
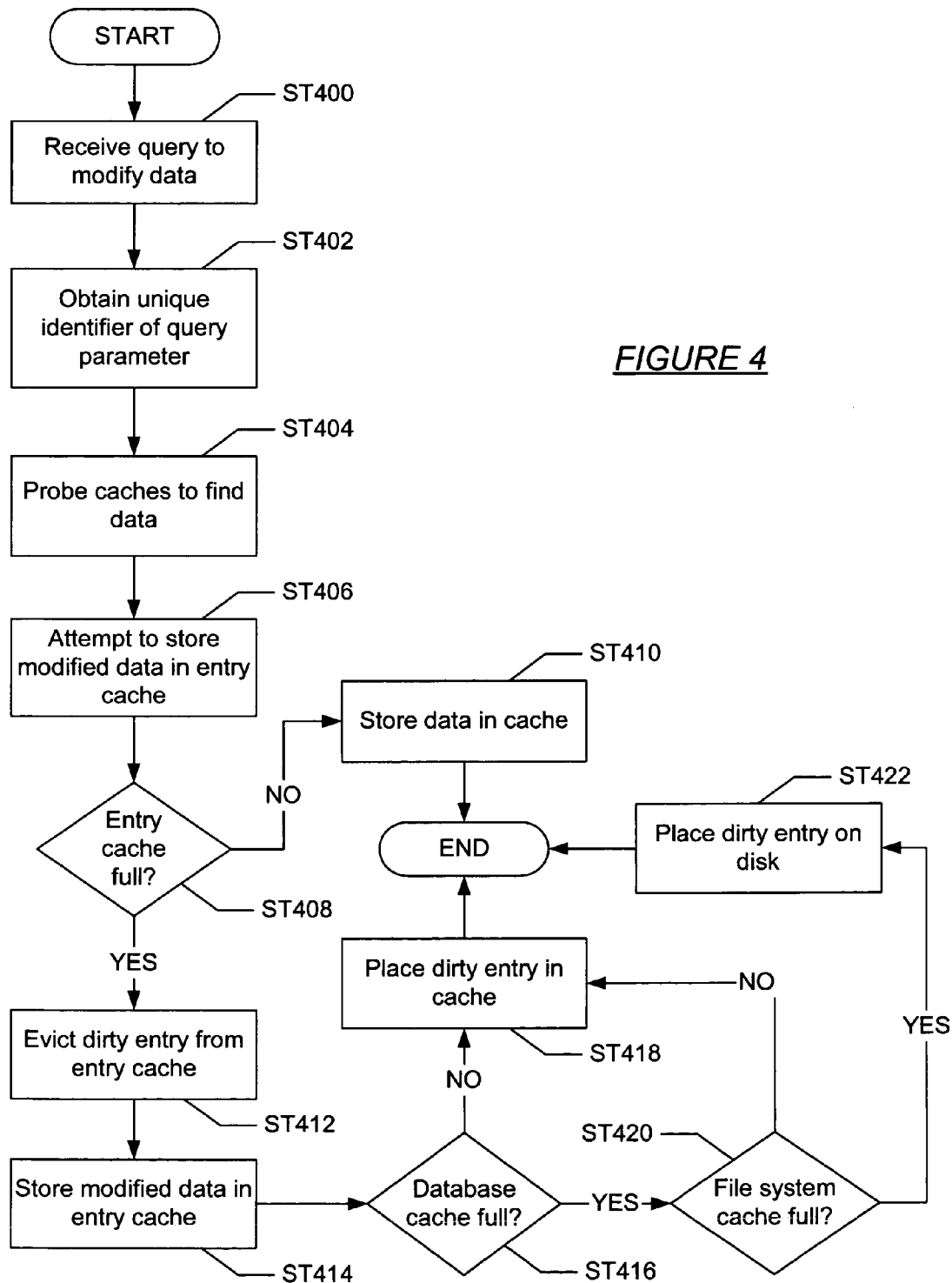
FIG. 4 shows a flow chart for modeling modifies in accordance with an embodiment of the invention.

FIG. 4 shows a flow chart for modeling modifies in accordance with one embodiment of the invention. Initially, a modify query is received by the database management system (Step 400). Again, the indices in the database cache are traversed to find a unique ID corresponding to the entry that a user wishes to modify (Step 402). Subsequently, the cache hierarchy is probed to find the data to be modified (Step 404). Once the data is found and modified, regardless of which cache in the hierarchy contained the data, an attempt is made to store the data in the entry cache (Step 406). At this stage, a determination is made to check whether the entry cache is full (Step 408). If the entry cache is not full, then the modified data is successfully stored in the entry cache and available for use (Step 410).

In one embodiment of the invention, if the entry cache is full, then one of the oldest entries in the entry cache is evicted in order to make room for the modified entry to be stored in the entry cache (Step 412). In one embodiment of the invention, the counters are used to model a least recently used (LRU) algorithm to determine the oldest dirty entry in the entry cache. The entry is subsequently removed from the entry cache, and an attempt is made to store the dirty data in the database cache (Step 414). If room exists in the database cache for the dirty data, then the dirty data is stored (Step 418) and the process ends. If the database cache is full (Step 416), then an attempt is made to store the dirty data in the filesystem cache. If the filesystem cache is also full, (Step 420) then the dirty data is stored on the disk drive (Step 422) and the process ends.

In one embodiment of the invention, in a database management system, such as a directory server, modified entries/pages in a cache are eventually written (i.e., committed) to the disk drive. Typically, a record of the modified entry/page is written to a transaction log file on disk when each modify operation is completed. Additionally, in one embodiment of the invention, the database cache is also updated with the modified entries/pages. In one embodiment of the invention, the modified entries/pages in the database cache must eventually be written to the disk drive. Therefore, a checkpoint operation is periodically initiated by the database management system. Checkpoints are a form of communication in which data is replicated (i.e., a copy of the data is sent to a duplicate source) so that if the database management system fails, then user data may be recovered from the checkpoint source. In one embodiment of the invention, a checkpoint operation evicts all the modified entries/pages in the database cache and places them into the filesystem cache. Subsequently, the operating system (which manages the filesystem cache) writes all the modified pages in the filesystem cache to the disk drive. In one embodiment of the invention, once this process is complete, the transaction log file may be deleted and a new transaction log file may be started.

The aforementioned processes of writing modified entries to the disk drive is implemented in the model to account for data recovery. Using this process, at any point in time, the contents of the database cache can be recovered using the disk drive image of the database management system and the transaction log file (which contains a records of all the modified entries/pages since the most recent checkpoint operation was completed). In one embodiment of the invention, the writes to the transaction log file are explicitly modeled.

In one embodiment of the invention, if the database cache is full, then modified entries in the cache will be evicted from the database cache into the filesystem cache to create space for more current modified entries. In order to allow dirty entries/pages to be evicted from the database cache into the filesystem cache, the operating system may periodically scan the filesystem cache and write some portion of the modified pages to the disk drive, which is known as a flush operation. In one embodiment of the invention, evicting dirty entries/pages from the database cache to the filesystem cache and flushing modified pages from the filesystem cache to the disk drive are modeled using the counters representing the number of loaded pages in a cache, the number of modified pages, and the sizes of the cache and the data and index files. In addition, in one embodiment of the invention, the checkpoint operations are modeled using the counters for the entries/pages in the filesystem cache. In each case, the number of modified pages is decremented as modified data is written to the disk drive.

In one embodiment of the invention, in order to accurately model the number of searches and modifies per second in the cache hierarchy (i.e., the performance of the cache hierarchy), the delay caused by a locking mechanism may also be simulated. Locking involves a particular thread (i.e., process) blocking other processes from accessing a particular entry (or page) in a cache while that entry (or page) is in use (i.e., being modified). In other words, locking keeps two processes separated. Additionally, locking prevents tampered or corrupted data from being stored in a cache. In one embodiment of the invention, locking is modeling using a probabilistic model. Specifically, the probability of encountering a lock in a particular partition (i.e., locking is modeled on a partition basis) while performing a modify operation is calculated using the number of threads running in the partition and the number of entries (or pages) in the cache.

For example, the probability of one thread encountering a locked page in a partition of a cache depends on both the number of threads already accessing pages in that partition and the number of pages in the partition. Specifically, if there is only one thread accessing pages in a partition, then the probability of encountering a locked page is 0.0. Moreover, with a small number of pages in a partition, entering threads are very likely to encounter a locked page and this probability increases with the number of threads already accessing pages in the partition. Alternatively, with a large number of pages in a partition, entering threads are less likely to encounter a locked page. In one embodiment of the invention, in order to model a locking mechanism, an additional counter (e.g., a lock counter) is used that tracks the number of threads running in a particular partition or locking area (i.e., the area of the partition for which the locking probability is calculated) of the database cache.

Specifically, the counter group associated with a cache tracks the number of pages in a partition, and the lock counter tracks the number of threads accessing pages in the partition. In one embodiment of the invention, these values are used to calculate the probability that a thread attempting to access a page in the partition (i.e., a locking area) encounters a locked page and is forced to wait until that page is "unlocked." Subsequently, if a random number test dictates that a locked page is encountered by the thread, then the lock counter displays the number of threads already in the same locking area. By checking how many other threads are in the same locking area, a delay of time may be estimated for the thread to obtain and release the lock. In other words, obtaining and releasing a lock is modeled using an estimated time delay depending on how many other threads wish to obtain and release a lock in the same area.

When the thread encounters a lock in the model, upon releasing the lock, the lock counter is decremented. This occurs because the thread has released the lock and is no longer in the locking area. As a result, the probability that the next thread that enters that locking area encounters a lock is decreased. Additionally, if a random number is chosen which signifies that the thread does not encounter a lock, then the lock counter is incremented in order to accurately increase the probability of encountering a lock for the next thread.

One skilled in the art will appreciate that the probability of encountering a lock may be calculated at any time while the model is running. For example, in one embodiment of the invention, a locking probability may be calculated each time a thread probes an indexing mechanism in the database cache. Alternatively, a locking probability may be calculated when a thread modifies data in a particular partition of the database cache. One skilled in the art will also appreciate that the delay of time used to model locks may be fixed or variable. For example, in one embodiment of the invention, the total delay used to model locks is a combination of a fixed CPU delay and a variable delay based on the number of threads running in a particular locking area.

Figure 5:
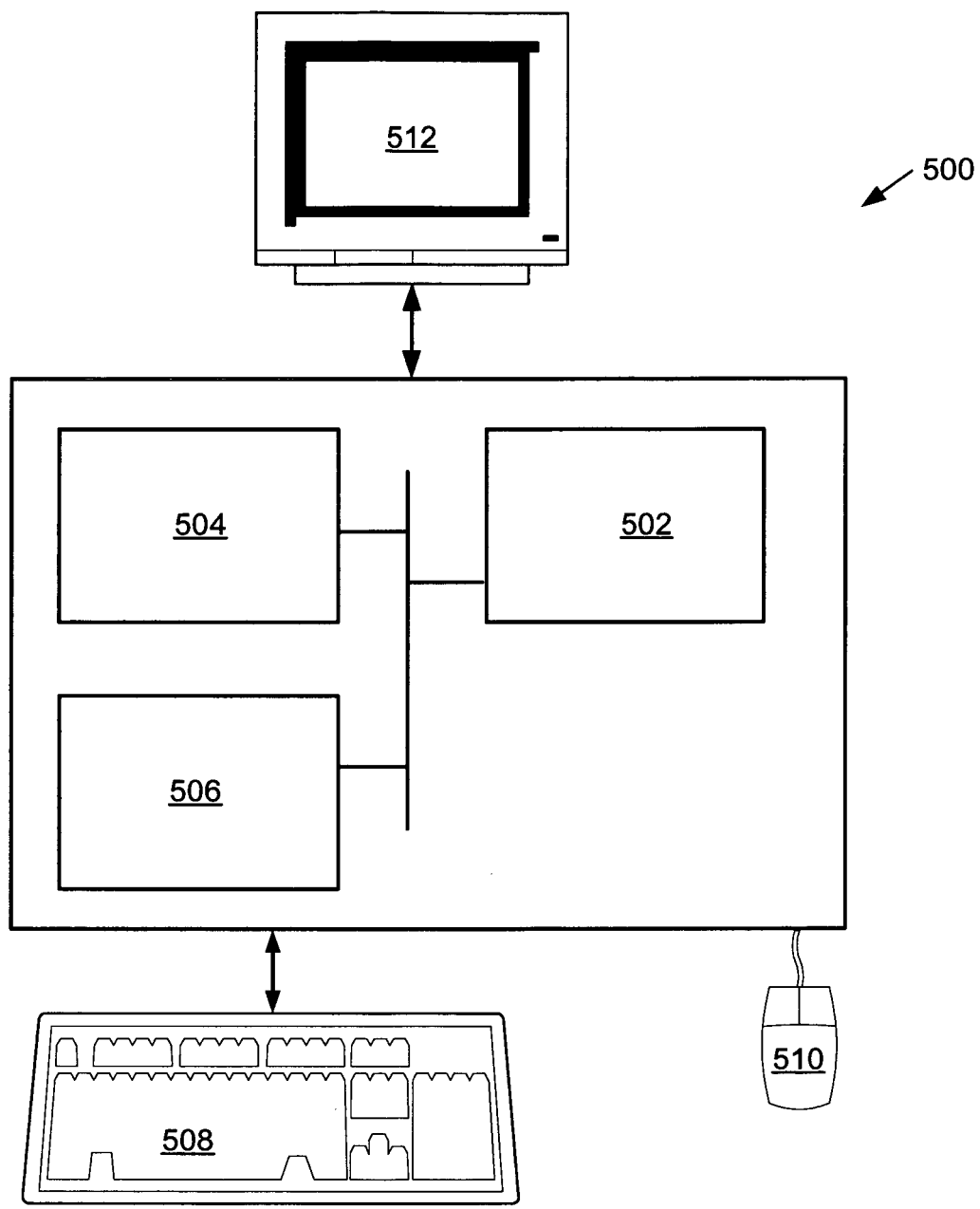
FIG. 5 shows a computer system in accordance with an embodiment of the invention.

An embodiment of the invention may be implemented on virtually any type of computer regardless of the platform being used. For example, as shown in FIG. 5, a networked computer system (500) includes a processor (502), associated memory (504), a storage device (506), and numerous other elements and functionalities typical of today's computers (not shown). The networked computer (500) may also include input means, such as a keyboard (508) and a mouse (510), and output means, such as a monitor (512). The networked computer system (500) is connected to a local area network (LAN) or a wide area network via a network interface connection (not shown). Those skilled in the art will appreciate that these input and output means may take other forms. Further, those skilled in the art will appreciate that one or more elements of the aforementioned computer (500) may be located at a remote location and connected to the other elements over a network.

Embodiments of the invention provide the ability to model the flow of data through a cache hierarchy within a database management system to analyze the performance of the database management system. Moreover, embodiments of the invention use counter groups to represent each cache in the cache hierarchy. The counter groups allow the model to predict the number of searches per transaction and the number of modifies per transaction within the cache hierarchy. With this information, along with modeling locks within the cache hierarchy, the model can accurately predict the performance in terms of transactions per second of the cache hierarchy, thus allowing a prediction of the performance of the entire database management system. Further, embodiments of the invention pre-load the counter values to predict steady-state behavior of the model. This allows performance to be analyzed quickly and effectively.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for modeling a database management system using a cache hierarchy, comprising:
   receiving a query to be searched in the cache hierarchy, wherein the cache hierarchy comprises a first cache and a second cache,
      wherein the first cache comprises a first partition and a second partition,
      wherein the first partition is associated with a lock counter,
      wherein the lock counter tracks a number of threads attempting to access data in the first partition, and
      wherein delay caused by a locking mechanism associated with the first partition is modeled based, in part, on the lock counter;
   computing a hit rate value associated with the first cache in the cache hierarchy, wherein the hit rate value is computed based, in part, on a counter group, wherein computing the hit rate value comprises computing a ratio of current contents of the first cache over a size of a file associated with the query, and wherein the file is cached in the first cache;
   comparing the hit rate value to a predetermined value to obtain a result, wherein the predetermined value is a number randomly selected from a uniform distribution, wherein a hit is determined when the predetermined value is not greater than the hit rate value;
   providing a reply to the query when the result corresponds to the hit;
   incrementing a counter in the counter group when the first cache is not full;
   proceeding to the second cache in the cache hierarchy when the result is a miss; and
   providing a diagnostic output comprising a overall performance for the database management system, wherein the overall performance is determined, in part, on the delay caused by the locking mechanism associated with the first partition.

2. The method of claim 1, wherein the counter group represents the first cache.

3. The method of claim 2, wherein the counter group comprises:
   a counter configured to track the size of the file;
   a counter configured to track a capacity of the first cache; and
   a counter configured to track current contents of the first cache.

4. The method of claim 1, wherein the query comprises one selected from a group consisting of a search query and a modify query.

5. The method of claim 1, further comprising: pre-loading the counter group with maximum values to obtain steady-state behavior.

6. The method of claim 1, wherein a locking probability is calculated in a locking area.

7. The method of claim 1, wherein the database management system is a directory server.

8. A computer system for modeling a database management system using a cache hierarchy, comprising:
   a processor;
   a memory;
   a storage device; and
   software instructions stored in the memory for enabling the computer system under control of the processor, to:
      receive a query to be searched in the cache hierarchy, wherein the cache hierarchy comprises a first cache and a second cache,
         wherein the first cache comprises a first partition and a second partition,
         wherein the first partition is associated with a lock counter,
         wherein the lock counter tracks a number of threads attempting to access data in the first partition, and
         wherein delay caused by a locking mechanism associated with the first partition is modeled based, in part, on the lock counter;
      compute a hit rate value associated with the first cache in the cache hierarchy, wherein the hit rate value is computed based, in part, on a counter group, wherein computing the hit rate value comprises computing a ratio of current contents of the first cache over a size of a file associated with the query, and wherein the file is cached in the first cache;
      compare the hit rate value to a predetermined value to obtain a result, wherein the predetermined value is a number randomly selected from a uniform distribution, wherein a hit is determined when the predetermined value is not greater than the hit rate value;
      provide a reply to the query when the result corresponds to the hit;
      increment a counter in the counter group when the cache is not full;
      proceed to the second cache in the cache hierarchy when the result is a miss; and
      provide a diagnostic output comprising a overall performance for the database management system, wherein the overall performance is determined, in part, on the delay caused by the locking mechanism associated with the first partition.

9. The method of claim 1, wherein the first partition and the second partition comprise data and a corresponding index configured to store a list of unique identifiers used to identify the search query.

* * * * *